United States Patent
Protzmann et al.

(12)

(10) Patent No.: US 6,387,146 B1
(45) Date of Patent: May 14, 2002

(54) GRANULAR FERTILIZER FOR PLANTS CONTAINING A TYPE OF MYCORRHIZAL FUNGUS

(75) Inventors: Mario Protzmann, Andernach; Harald Böckem, Köln, both of (DE)

(73) Assignee: Maltaflor Düngergesellschaft mbH, Andernach (DE)

( * ) Notice: Subject to any disclaimer, the term of this patent is extended or adjusted under 35 U.S.C. 154(b) by 0 days.

(21) Appl. No.: 09/869,873

(22) PCT Filed: Oct. 2, 1999

(86) PCT No.: PCT/DE99/03188

§ 371 Date: Jul. 6, 2001

§ 102(e) Date: Jul. 6, 2001

(87) PCT Pub. No.: WO00/23399

PCT Pub. Date: Apr. 27, 2000

(30) Foreign Application Priority Data

Oct. 20, 1998  (DE) .......................................... 198 48 337

(51) Int. Cl.$^7$ ................................................ C05F 11/00
(52) U.S. Cl. ........................ 71/11; 71/13; 71/23; 71/32; 71/64.01; 71/64.03
(58) Field of Search .............................. 71/11, 13, 23, 71/64.1, 64.03, 32

(56) References Cited

U.S. PATENT DOCUMENTS

| 4,337,077 A | * | 6/1982 | Rutherford ..................... 71/9 |
| 4,534,781 A | * | 8/1985 | Wu et al. ........................ 71/5 |
| 4,749,402 A | * | 6/1988 | Garrett et al. ................. 71/28 |
| 5,786,188 A | * | 7/1998 | Lamar et al. ............... 435/177 |

FOREIGN PATENT DOCUMENTS

| DE | 4424574 | * | 8/1995 |
| DE | 4426851 | * | 2/1996 |
| EP | 286351 | * | 10/1988 |
| EP | 654211 | * | 3/1995 |
| FR | 2658184 | * | 8/1991 |
| WO | 9412576 | * | 6/1994 |

* cited by examiner

Primary Examiner—Chhaya D. Sayala
(74) Attorney, Agent, or Firm—John Lezdey

(57) ABSTRACT

The invention relates to a granular fertilizer for plants, the grains of said fertilizer containing spores and/or mycellium of at least one type of mycorrhizal fungus in sufficient amounts to ensure symbiosis.

13 Claims, No Drawings

GRANULAR FERTILIZER FOR PLANTS CONTAINING A TYPE OF MYCORRHIZAL FUNGUS

BACKGROUND OF THE INVENTION

The invention relates to a granular fertilizer for plants.

This type of fertilizer forms for example the subject of DE 44 24 574 A1. This previously known fertilizer uses malt germs which are generated in the process of malting ale cereals and are removed from the malt grain after drying has been accomplished. It is granular, which is appropriate for spreading. Typically, the grains fit through sieve openings with square or round holes, the side length or the diameter of which ranges from 3 to 5 mm. Larger- or smaller-sized sieve widths are not excluded, though.

In principle, the fertilizer of the type mentioned herein above has proved very efficient. As compared to other fertilizers, a considerably higher mass of as roots has been observed for example.

In principle, fertilizers denote all kinds of plant nutrients. Usually, a fertilizer contains nitrogen, phosphorus and potassium. But these components need not necessarily be contained and more particularly do not have to be contained in the share prescribed by the national Regulations for the minimum requirements made upon a fertilizer.

SUMMARY OF THE INVENTION

It is the object of the present invention to develop a fertilizer like for example the previously known fertilizer described in the above mentioned published application in such a way that additives are added that do not nourish the plant but that associate with the roots of a higher plant while mutually exchanging substances.

This object is achieved by a granular fertilizer for plants that contains in its grains spores and/or the mycelium of at least one type of a mycorrhizal fungus.

DETAILED DESCRIPTION

Mycorrhiza designates the association of a fungus and the roots of a higher plant, a symbiotic relationship being thereby formed. Such a mycorrhizal symbiosis between the roots of higher plants and the hyphae of the fungus not only serves to improve the absorption of water and mineral nutrients, the fungus is moreover capable of protecting the plant against toxic organisms by producing antibiotic substances.

There are two types of micorrhizae:

The endotrophic mycorrhizae on one hand, called endomycorrhizae in short. In this. type of mycorrhiza, the hyphae of the fungus grow into the cells of the plant's roots. This type of mycorrhiza is particularly suited for agricultural useful plants.

On the other hand, the ectotrophic mycorrhiza, called ectomycorrhizae in short. It predominates on trees of the temperate zones. In this type of mycorrhiza, the fungus grows into the roots of the host and the hyphae penetrate between the outer cells of the bark. They thereby form a typical, labyrinth-like structure. The fungus forms a mantle of hyphae on the surface of the roots, said mantle having a structure that is typical of the ectomycorrhizae. The mantle of hyphae mechanically protects the tips of the roots, encapsulates the root that is no longer in contact with the soil, protecting it thus against an invasion by pathogens. It furthermore serves to store calcium, potassium, carbohydrates, phosphates and nitrogen compounds.

Through the mycelium of the fungus, mycorrhizal roots can gain access to a larger volume of soil than uninfected ones. The surface that is active in taking up nutrients is strongly enlarged. Thanks to the fungus, the plant can make better use of both organic and inorganic sources of nitrogen, even when the potential of soil water is reduced. This reservoir of nutrients is then available for both the fungus and the plant.

It has not yet become known to directly combine or mix fertilizers with spores and/or the mycelium of micorrhizae. What is known is to grow under sterile conditions mycelia of the type of fungus of concern as a vegetative inoculum on various porous materials, for example on swelling clay. When introducing the vegetative inoculum, it is to be made certain that the substance used for inoculation survives until the plants has formed roots. It is difficult to preserve the sterility of the substratum until the roots have formed, and in open air it is not possible. Using sugar as an energy source for the fungus in the unsterile substratum until the mycorrhiza has formed is only restrictedly suited since antagonists that have been born in the soil exploit the energy resources and endanger the survival of the inoculum until the roots have formed.

It also has been known to directly admix to the substrata spores in the form of powder or pellets or to apply them as a suspension by spraying said suspension onto a surface of the substratum. This method cannot be used for most of the types of fungus suited for entering into mycorrhizal relationships since they do not produce enough spores.

Hitherto, the mycorrhiza inoculum was introduced into the substratum at differential times:

On one hand, the admixture to the substratum is carried out at the time of sowing, which has the advantage that it does not require an additional working cycle. The fungus and the plant have the advantage of the symbiotic partnership from the very beginning. This is particularly suited for the method using the spores.

On the other hand, admixing is performed later, e.g. by inoculating vegetative mycelium. The already mentioned disadvantages arise thereby. It has been known to introduce the inoculum into the substratum during transplantation or after the roots have developed. This however requires an additional working cycle, in which the plants are moreover disturbed in their growth.

The hitherto available technologies are not practicable enough.

The fertilizer according to the invention contains spores of a mycorrhizal fungus and/or vegetative mycelium. The fungi are thereby endomycorrhizae or ectomycorrhizae. Examples of ectomycorrhizae are pisolitus tinctorius (arhizus), sclerotinia ranzium, paxfillus involutus, lactarius ssp., tuber, boletus edulis, xerocomus badius, hebeloma ssp., laccarina laccarata, laccarina lametistina, soilus ssp. Examples of endomycorrhizae are glomus ssp., rhizoctonia, endogane, acaulospora, gigaspora, scierocystis.

The advantages of the method according to the invention lie in the following:

The fertilizer according to the invention is readily usable in the sectors of horticulture, tree-nurseries, agriculture and hobby.

The actual fertilizer and the mycorrhizal fungus are applied together in one single working cycle.

In the difficult starting phase until the plant has developed its roots, the fungus is capable of growing on account of the nutrients already contained in the fertilizer.

The substratum is invaded by the fungus already before the roots have developed, a mycorrhizal relationship being established from the very beginning.

Altogether, these advantages make it possible to successfully use this method in open air in unsterile substrata.

In a particularly preferred development, the fertilizer according to the invention is provided with carbohydrates, preferably in 3, preferably in at least 10 weight per cent. The carbohydrates are more specifically present in the form of starch and/or sugar. The sugar of particular preference is maltose, as it is yielded by the malt germs for example. The other starch sources suited for use are more specifically cereals and potatoes, e.g. amylose and amylosepectin, the sugars, e.g. glucose, fructose, saccharose or raffinose.

In a preferred embodiment, the fertilizer has at least 50 percent in weight malt germs, as they are obtained when ale cereals are malted, and that are removed from the malt grain after drying. Higher shares of malt germs, e.g. 60, 70 or 80 percent in weight, up to 100% are advantageous.

It could be proved that with such a type of fertilizer, which contains considerable shares of malt germs, the growth of the roots was strongly stimulated. Combined with the inoculation of mycorrhizal fungus, it forms the basis for increased fungus-plant contacts, that is mycorrhizal association. The high carbohydrate content, which constitutes an important source of nutrients for the mycorrhiza, ensures that energy be supplied to the mycorrhiza until symbiosis has been achieved. Thanks to the granulation, all the nutrients are offered in the zone that most contains mycorrhizae, which gives it a competitive advantage over antagonists or parasitic fungi. Moreover, malt germs contain appreciable quantities of yeast fungi. These encourage the formation of mycorrhizal relationships. The sustained-release property of fertilizers mainly containing malt germs is propitious to the development of mycorrhiza and plant since nutrition of the two organisms is guaranteed until the symbiotic partnership has been established and even after that.

On principle however, any other fertilizer is suited as a carrier substance. The combination of very efficient types and origins of mycorrhizal fungi is possible without any problem by admixing them to the actual fertilizer material.

The fertilizer according to the invention preferably contains at least 5 percent by weight, preferably at least 10, and more specifically at least 20 percent by weight spores of at least one type of mycorrhizal fungus to the ton of final product.

The fertilizer according to the invention makes it possible to combine favourable properties of plant nutrition and the capacity of establishing efficient symbiotic relationships between plant and microorganism, which leads to high-yielding plants even under extreme and problematic conditions. This permits to decisively contribute in preventing erosion and in preserving fertility of soil.

Malt germs in pure form have a nutrient content of typically 5.6% nitrogen, 3.3% phosphate and 3.2% $K_2O$, all the data being given in percent by weight. On account of these nutrient contents, malt germs are well suited to serve as fertilizers. Malt germs consist of physiologically young tissue that may readily be mineralised and make certain of a good fertilizing effect that lasts for approximately one vegetation period. The fertilizer made of malt germs is a fertilizer that is made on the basis of pure vegetable, organic substances. Inasmuch, malt germs are well suited for being used as a fertilizer. Test results give evidence for the good fertilizing effect of malt germs.

In its major part, that is in at least 50%, the fertilizer preferably consists of malt germs. Further favourable admixtures, which act positively upon the fertilizing effect, proved to be barley and/or malt dusts as they are obtained for example from malting. These dusts, which are automatically produced in the process of malting, can be thus used in a sensible way. Accordingly, in a preferred development the fertilizer contains cereal and/or malt dusts in a ratio of malt germs to dusts comprised between from 2/3 to 1/3 and from 3/4 to 1/4.

The cereal and/or malt dusts have a high share of low polymeric carbohydrates and sugar which in turn promote the mineralization of nutrients because carbohydrates and sugar may serve as nutrients for those microorganisms that promote the mineralization of nutrients. The mixture of malt germs and dusts typically has a nutrient composition of approximately 3.5% nitrogen, 2.2% phosphate and 2.1% $K_2O$, all the data being given in percent by weight.

In practical use, a grain size of between 10 by 30 mm and 3 by 5 mm proved particularly favourable. On account of the granulation and of the grain sizes indicated, the fertilizer according to the invention is easy to apply, it may be spread easily with spreaders or by hand so that it altogether is readily proportionable. The grain sizes of preference are sizes in the lower range, that is near to 3 by 5 mm. Their manipulation is particularly advantageous.

In order to be capable of pelletizing and granulating the mixture of malt germs and fungus material, which possibly includes the added barley and malt dusts, the pressed material has to be moistened. The dry-matter content of the malt germs, with the dusts or without them, typically amounts to 94%. Moistening of 85to 90% dry matter is suited and necessary for pelletizing and granulating. Moistening is carried out by adding an aqueous fluid. Said fluid may exclusively consist of water, but it may more specifically and preferably contain additional fertilizing agents. The flow of water permits to convey nutrients like for example phosphorus, potassium, magnesium or even micronutrients like, e.g. copper. On the other side however, the flow of water may be replaced by liquid fertilizers as they are already available on the market. By adding nutrients through and in the aqueous fluid, the nutrient ratio of the final fertilizer may be influenced ad lib so that the specific demands of a type of plant to be fertilized can be adjusted to. A specific fertilizer for flowering plants, for conifers, for vegetable, strawberries and the like can thus be manufactured.

The invention is explained herein after with the aid of an exemplary embodiment:

On malting ale cereals, that is in particular barley or wheat destined for brewing, radicles are formed, each grain usually forming 3 to 5 radicles having a length of about 10 to 14 mm and a diameter of approximately between 0.4 and 0.7 mm. On drying, the grain is dried together with its radicle. Then, the radicle can be cut off if it has not yet been previously removed by mechanical treatment. The malt germs are not to be contained in the finished malt as it is required for making beer because they affect the brewing process.

Dusts are also produced during the whole process of malting. In the first stages of the malting process, the dusts yielded are pure cereal dusts, more particularly barley dusts, in the later stages, malt dusts are produced. To produce the fertilizer according to the invention, the malt germs and the dusts produced per initial quantity of ale cereal used are blended together. In a concrete realization, the ratio of mixture is of 70% malt germs and 30% dusts. 20 g spores of a type of mycorrhiza are added to the ton fertilizer, that is, e.g. to the above mentioned ratio of mixture, this mixture being subsequently treated in the following way:

In order to be capable of converting the mixture of malt germs, fungus material and dusts into a granular form, the pressed material must be moistened. The dry-matter content typically amounts to between 92 and 96%. Moistening through addition of an aqueous fluid is carried out in such a manner that 12 percent by weight of water is for example contained in the mixture consisting of malt germs and dusts.

In a specific embodiment, the aqueous admixture is a commercially available liquid fertilizer. A small quantity of copper is moreover added. The mixture is granulated in a conventional pelletizing or granulating device. It may then be packaged in quantities that are customary in trade and may be offered for sale.

The maximum spreading quantity to the square meter is of approximately 1.5 kg. In most cases, a spreading quantity of somewhat short of 1 kg is sufficient.

The disclosure of DE 44 24 574 A1 mentioned herein above pertains to the disclosure content of the present application.

What is claimed is:

1. Fertilizer grains for plants, the improvement comprising fertilizer grains containing at least 50 percent by weight malt germs produced in the process of malting ale cereals and removed from the malt grain, and containing at least 10 g mycorrhizal spores, or at least 5 percent by weight mycelium.

2. The fertilizer grains of claim 1 comprising at least 15 percent by weight to the ton of a mycorrhizal fungus.

3. The fertilizer grains according to claim 1, wherein the mean diameter of the grains is between 2 and 8 mm.

4. The fertilizer grains according to claim 1 wherein the fertilizer grains include at least 3 percent by weight carbohydrates.

5. The fertilizer grains of claim 4 wherein said carbohydrates are selected from the group consisting of starch and sugar.

6. The fertilizer grains according to claim 4, wherein the carbohydrate contained in the fertilizer grains is maltose.

7. The fertilizer grains according to claim 1, wherein the fertilizer grains include a member selected from the group consisting of barley dusts and malt dusts.

8. The fertilizer grains of claim 1, wherein the ratio of malt germs to dusts is between 2/3 to 3/4 and 1/4.

9. The fertilizer grains according to claim 1, wherein said grains are granulated or pelletized.

10. The fertilizer grains according to claim 9, wherein said grains contain fertilizer nutrients.

11. The fertilizer grains according to claim 10, wherein said nutrients are selected from the group consisting of liquid fertilizer, phosphorous, potassium, magnesium and micronutrients.

12. The fertilizer grains according to claim 11, wherein said micronutrients are copper.

13. Ferfilizer grains for plants comprising:

a) at least 50% by weight malt germs;

b) at least 10 grams of mycorrhizal spores;

c) at least 5% by weight mycelium;

d) at least 3% by weight of carbohydrates;

e) barley dust or malt dust, and f) fertilizer nutrients.

* * * * *